Jan. 5, 1971  R. R. MYERS  3,551,930
SWIMMING POOL CLEANER
Filed Oct. 4, 1967  5 Sheets-Sheet 1
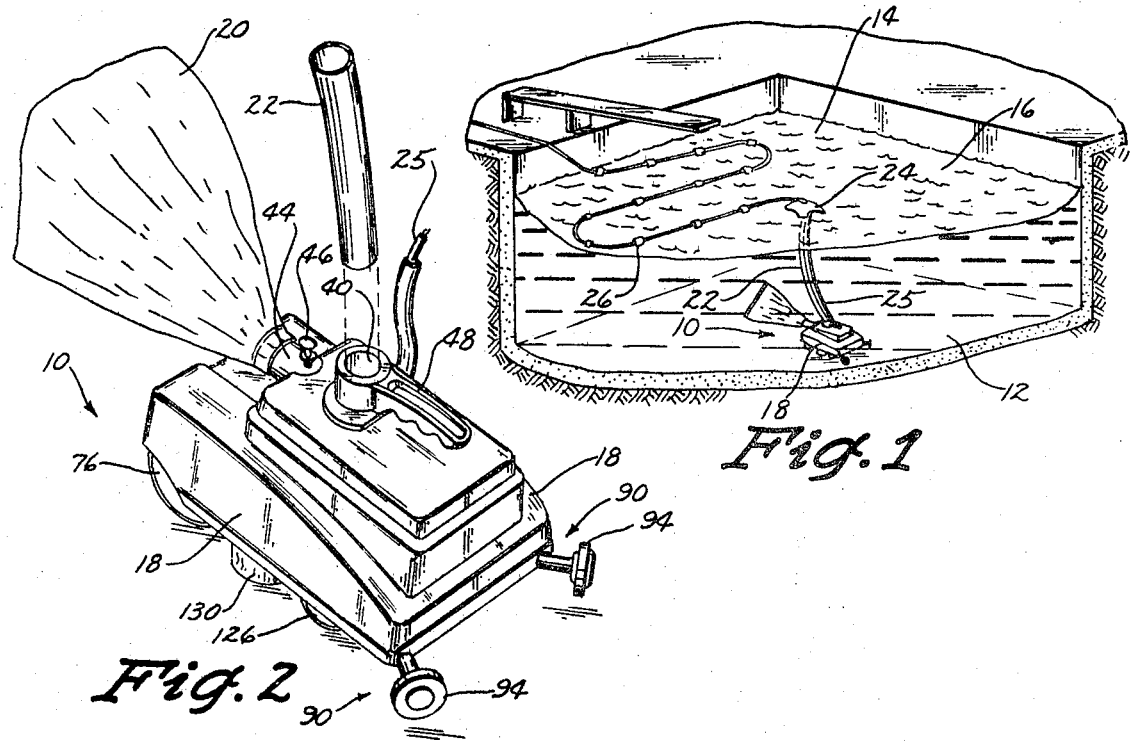
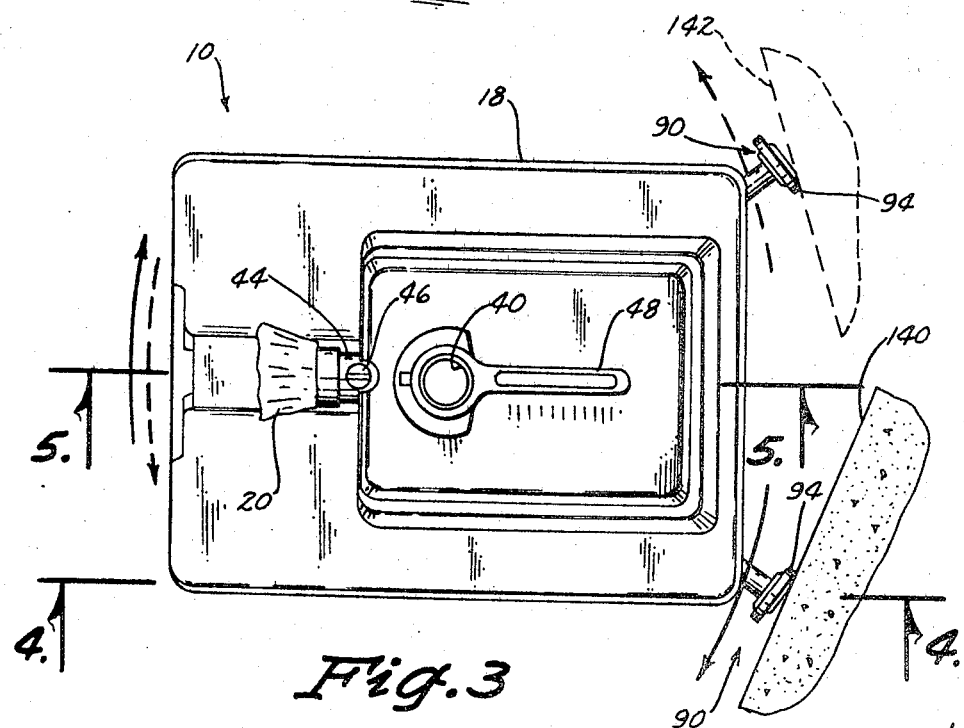
INVENTOR
ROBERT R. MYERS
BY
Dick Zarley, McKee & Thomte
ATTORNEYS Jan. 5, 1971 R. R. MYERS 3,551,930
SWIMMING POOL CLEANER
Filed Oct. 4, 1967 5 Sheets-Sheet 2

INVENTOR
ROBERT R. MYERS
BY
Zarley, McKee & Thomte
ATTORNEYS

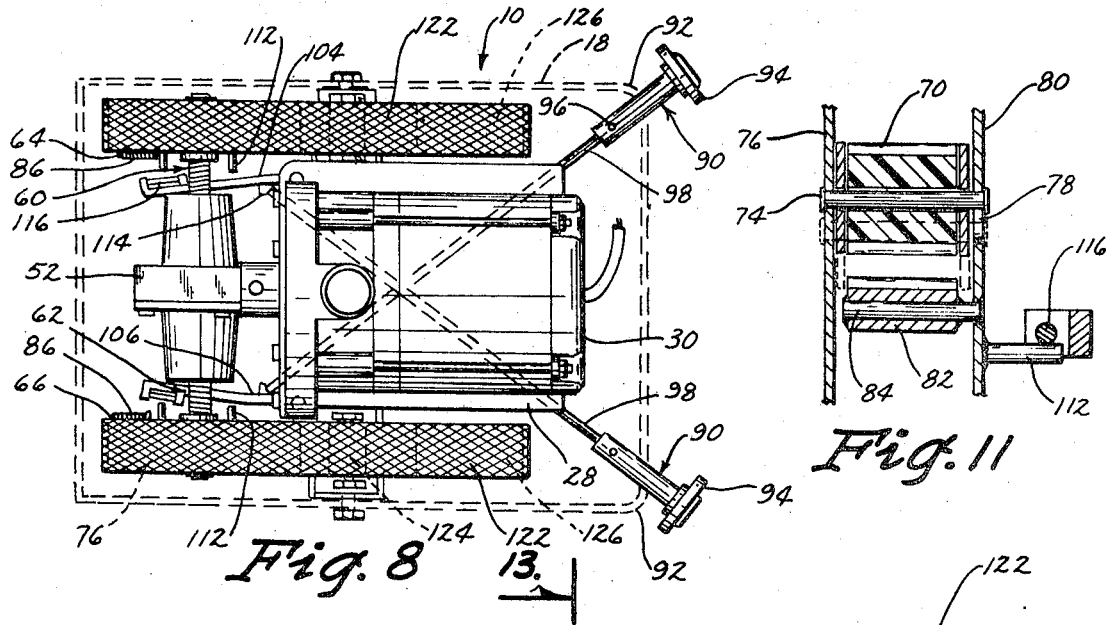
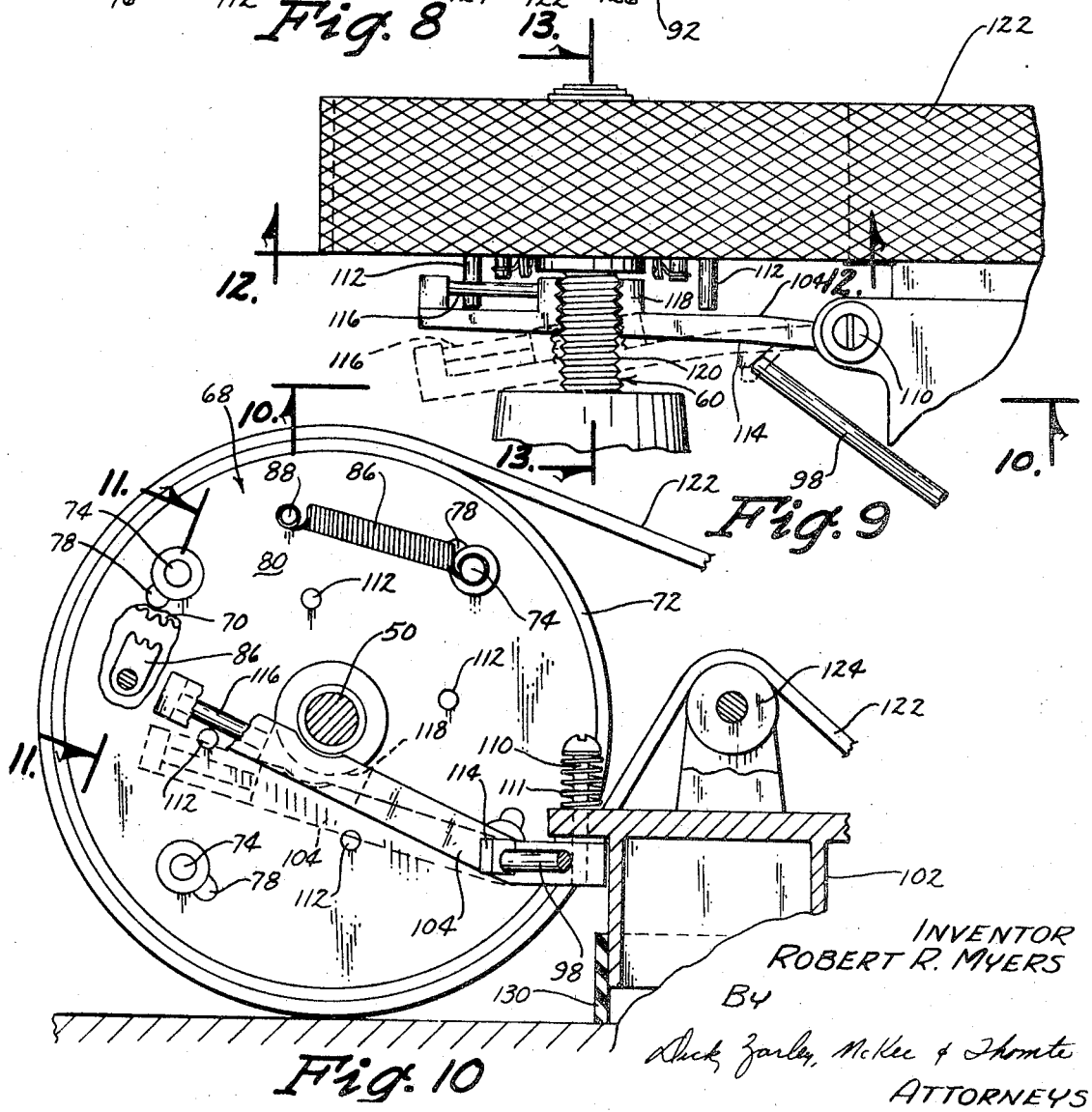

INVENTOR
ROBERT R. MYERS
BY
ATTORNEYS

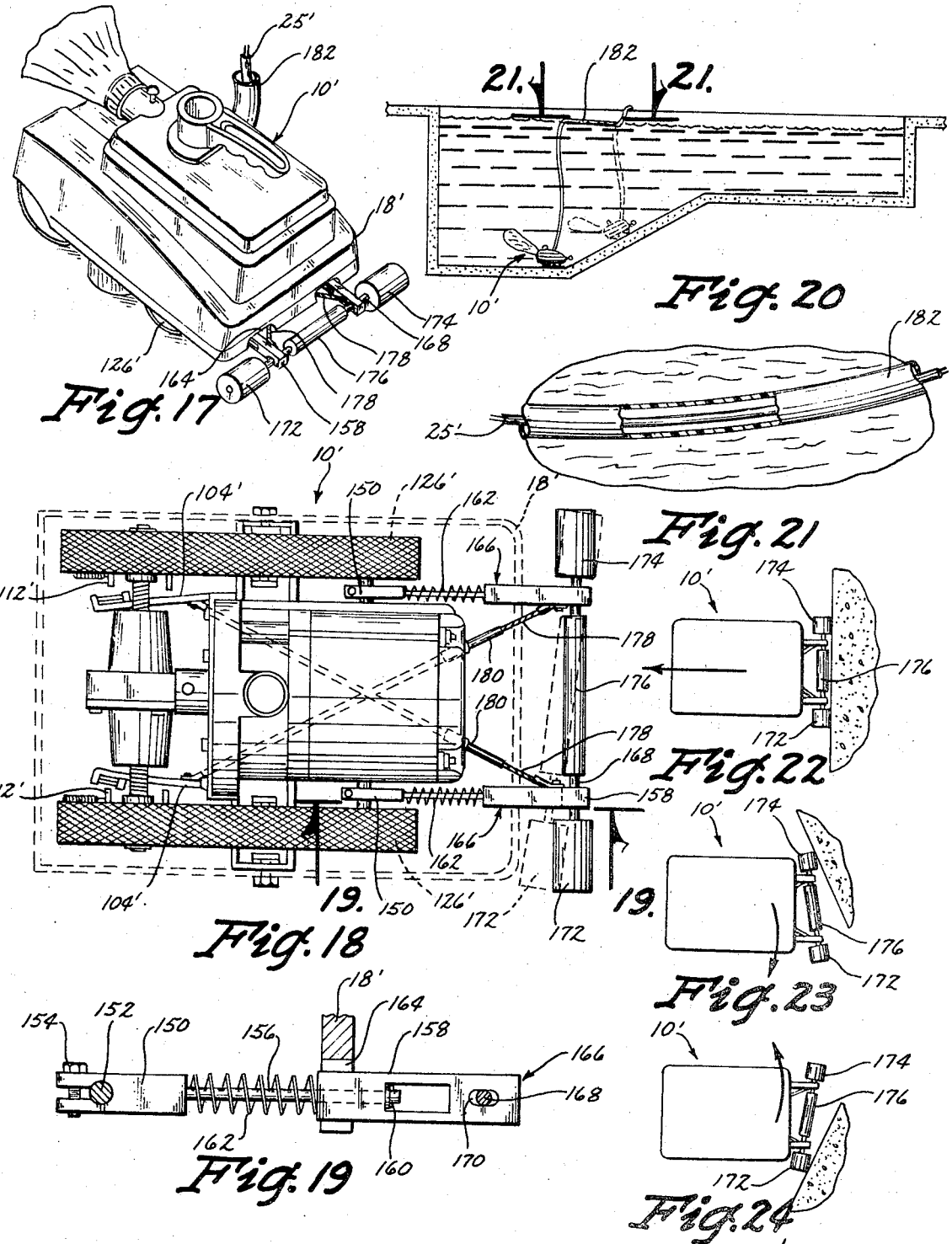

United States Patent Office 3,551,930
Patented Jan. 5, 1971

3,551,930
SWIMMING POOL CLEANER
Robert R. Myers, 904 NE. 2nd St.,
Boca Raton, Fla. 33432
Continuation-in-part of application Ser. No. 606,663,
Jan. 3, 1967. This application Oct. 4, 1967, Ser.
No. 672,923
Int. Cl. E04h 3/20
U.S. Cl. 15—1.7                                 4 Claims

ABSTRACT OF THE DISCLOSURE

A machine for cleaning the bottom and the surface water of swimming pools wherein the machine is movable along the bottom and is provided with a guidance control system which will change the direction of travel a predetermined amount as the machine encounters obstructions to the side or front such as the sidewalls of the pool. The machine may be of a crawler type and has a transmission for automatically controlling the forward and reverse rotation of the drive wheels whereby one or both drive wheels may be operating in the same direction at the same time. Sensing means for actuating the transmission are provided and are adjustable to assure that the machine will clean the maximum area of the pool but prevent it from being overturned.

---

This is a continuation-in-part application of the application, Ser. No. 606,663, filed Jan. 3, 1967 which issued as Pat. No. 3,439,360, Apr. 22, 1969. Additionally, the applicant has disclosed in previously issued patents earlier models of cleaning machines for swimming pools. For example, Pat. No. 3,321,787, issued May 30, 1967, cleaning brushes were provided for contact with the bottom of the pool and served to help propel the machine. In Pat. No. 3,324,492, issued June 13, 1967, among other structural improvements the guidance system was changed to include an idler wheel for contacting obstructions to change the direction of travel of the machine over the bottom of the pool.

The machine of this invention involves positive control of the guidance system upon encountering an obstruction at either the front or the side of the machine. The sensing elements at opposite front corners of the machine will be actuated by lateral or frontal forces and are coupled directly to transmission means for reversing the direction of one or more of the drive wheels. The drive wheels upon being rotated rearwardly may be set to return to their forward rotational movement after being rotated a predetermined time in reverse whereby the machine is turned a predetermined number of degrees from its original line of travel to thereby move around an obstruction. The number of degrees the machine turns upon one or more of the sensing elements being actuated may be varied as desired. If both of the sensing elements on the front of the machine are actuated the machine will then operate in reverse for a predetermined time. The machine having sensing elements at opposite front corners of the frame has the sensing elements coupled to diagonally opposite rearward drive wheels to thereby facilitate movement away from or around obstructions particularly to the side of the machine. The actuating lever which operates the transmission means to cause it to turn the drive wheels in a reverse direction is at the same time moved into operative engagement with the continuously rotating drive shaft for the drive wheels and through cooperating threads on the lever and drive shaft the lever returns the transmission to its forward drive position. Additionally, a machine is also shown which has a modified sensing means at the forward end thereof. The modified form of the machine has a sensing element at each of the forward corners together with a sensing element which couples the same to insure that the machine will be turned or reversed as the case may be upon encountering an obstruction.

These and other features and advantages of this invention will become readily apparent to those skilled in the art upon reference to the following description when taken into consideration with the accompanying drawings, wherein:

FIG. 1 is a fragmentary perspective view of the swimming pool cleaner in use in a filled pool;

FIG. 2 is a perspective view of the cleaner machine only;

FIG. 3 is a top plan view of the cleaner machine in various positions relative to obstructions;

FIG. 8 is a top plan view with the housing removed;

FIG. 9 is an enlarged fragmentary view of the drive shaft in relationship to the transmission lever and drive wheel;

FIG. 10 is an enlarged side elevation fragmentary view taken along line 10—10 in FIG. 9.

FIG. 11 is a cross-sectional view taken along line 11—11 in FIG. 10;

FIG. 17 is a perspective view of the modified version of the cleaner machine only;

FIG. 18 is a top plan view of the machine of FIG. 17 with the housing removed;

FIG. 19 is an enlarged sectional view of the sensor support means at one side of the machine as seen along line 19—19 at FIG. 18;

FIG. 20 is a sectional view of the swimming pool illustrating the swimming pool cleaner in use;

FIG. 21 is an enlarged sectional view of the electrical conduit as seen along lines 21—21 of FIG. 20 with portions thereof cut away to more fully illustrate the invention;

FIG. 22 is a top plan view of the cleaner machine of FIG. 17 encountering an obstruction;

FIG. 23 is a top plan view of the cleaner machine of FIG. 17 encountering an obstruction with the left front sensor element; and FIG. 24 is a top plan view of the cleaner machine of FIG. 17 encountering an obstruction with the right front sensor element.

Figure 4:
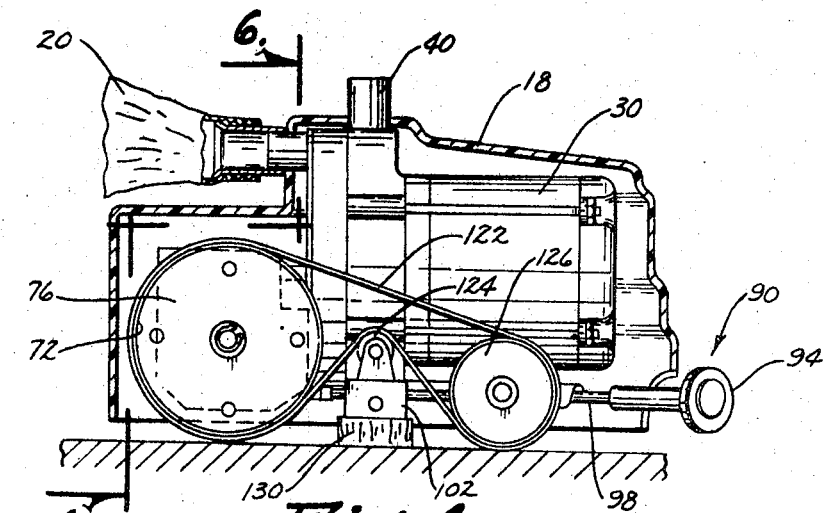
FIG. 4 is a side elevation cross-sectional view of the cleaner machine taken along line 4—4 in FIG. 3.

With respect to FIGS. 1–16, the cleaner machine of this invention is referred to generally in FIG. 2 by the reference numeral 10 and is illustrated in FIG. 1 on the bottom 12 of a swimming pool 14 filled with water 16.

A plastic or the like housing 18 encloses the machine and extending externally from the machine 10 is a cleaner bag 20 and a water conduit 22 connected to a flotation unit 24 at the top of the water 16. Electrical power is supplied through lead wires 25 supported by the flotation unit 24 having supplemental smaller units 26. The flotation unit 24 for cleaning the water at the top surface and holding the lead wires 25 are more fully disclosed and described in applicant's Pat No. 3,-324,492, issued June 13, 1967.

Referring now to FIG. 8 it is seen that a frame is formed by a motor base 28 having a motor 30 mounted thereon connected directly to a chopper assembly 32 (FIG. 5) having curved radial blades 34 (FIG. 7), and thence to a pump assembly 36 having an outlet conduit 38. The chopper assembly 32 is mounted in a chamber 40 in communication with the pump through an opening 42 which in turn is in communication with outlet conduit 38 which is connected to the cleaner bag 20.

As seen in FIG. 2 the cleaner bag 20 has a sleeve portion 44 telescopically mounted on the outlet conduit 38 and is locked thereto by a thumb screw 46. A handle member 48 is locked by a set screw (not shown) to the surface water inlet conduit 40 and in turn receives the water conduit 22 which is held by set screws carried by the handle member 48 which are not shown.

Referring again to FIG. 5, a drive shaft 50 extending rearwardly from the motor 30 drives the chopper assembly 32 and the pump 36 and then extends into a gear box 52 which includes a worm 54 in engagement with a worm gear 56 mounted on a transversely extending drive shaft 58.

The drive shaft 58 is coupled through its outwardly extending portions 60 and 62 to rear drive wheels 64 and 66 respectively (FIG. 8). Each of the drive wheels 64 and 66 includes a forward and reverse drive transmission 68 shown specifically in FIGS. 12 and 13.

The drive wheels and transmissions 68 are identical except that they face in opposite directions and include a sprocket gear 66 (FIG. 12) keyed to the drive shaft portion 60 and in turn intermeshed with a plurality of spur gears 70 which are in engagement on the inner side of an outer ring gear 72 which forms the wheels 64. Each of the spur gears 70 is rotatably mounted on shafts 74 affixed to an outer plate 76 (FIG. 13). The inner ends of the spur gear shafts 74 are movably received in arcuate slots 78 formed in an inner plate 80. A driving dog 82 (FIGS. 11 and 12) carried on a shaft 84 affixed to the inner plate 80 is biased into engagement with a spur gear 70 by a tension spring 86 (FIG. 10) mounted on the inner face of the inner plate 80 and being anchored to a pin 88 affixed to the inner plate and connected at its opposite end to the shaft 74 of the spur gear 70 in engaging the driving dog 82.

Figure 12:
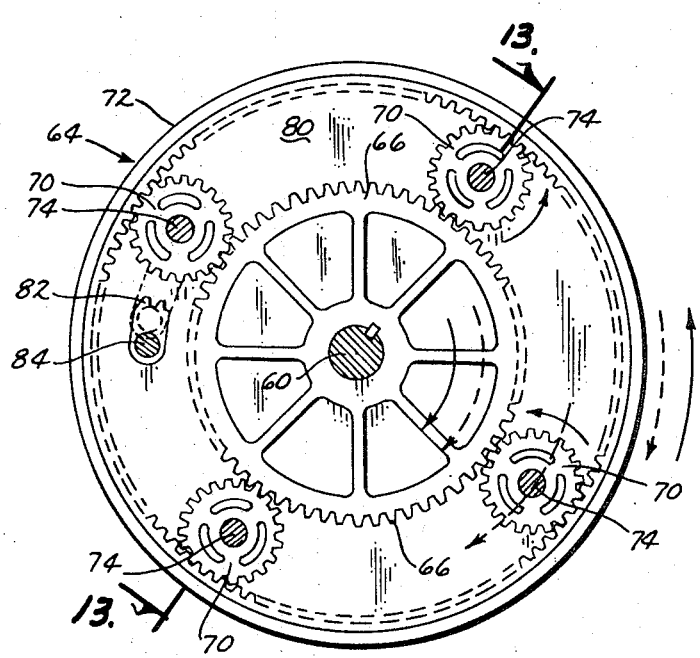
FIG. 12 is a cross-sectional view of a transmission unit associated with one of the drive wheels taken along line 12—12 in FIG. 9.
Figure 13:
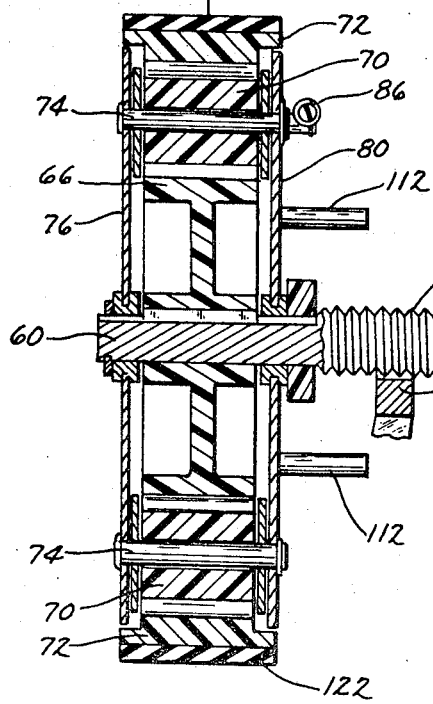
FIG. 13 is a cross-sectional view taken along line 13—13 in FIG. 9.

Accordingly, as the driving shaft 58 is rotated and the end portion 60 turns the inner sprocket gear 66 the rotational movement is transmitted directly through the spur gears 70 which are prevented from rotating by the driving dog 82, to the ring gear 72 which then causes the wheels 64 to rotate in the forward direction as indicated by the dash line arrows in FIG. 12. The dash line arrows further indicate in FIG. 12 the rotational movement of the spur gears 70 with the sprocket gear 66 when the wheel 64 is being driven forwardly.

The manner in which the drive wheels are reversed will now be described.

Figure 5:
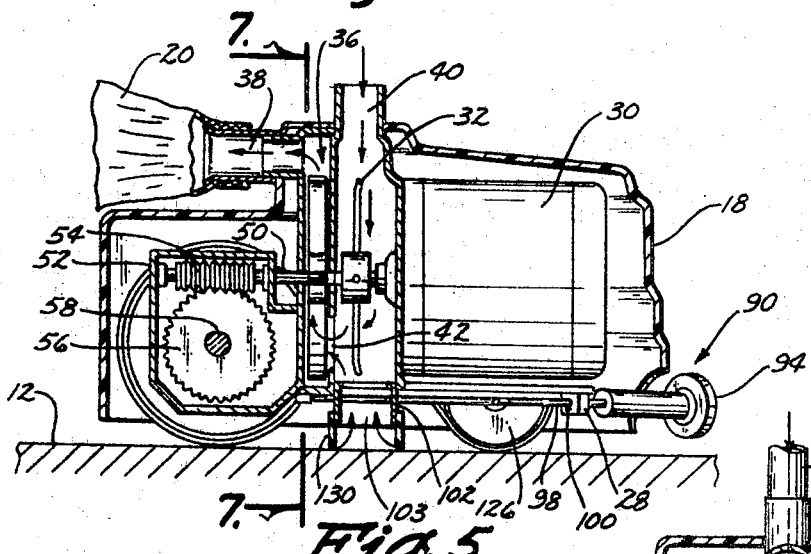
FIG. 5 is a cross-sectional view of the cleaner machine taken along line 5—5 in FIG. 3.
Figure 6:
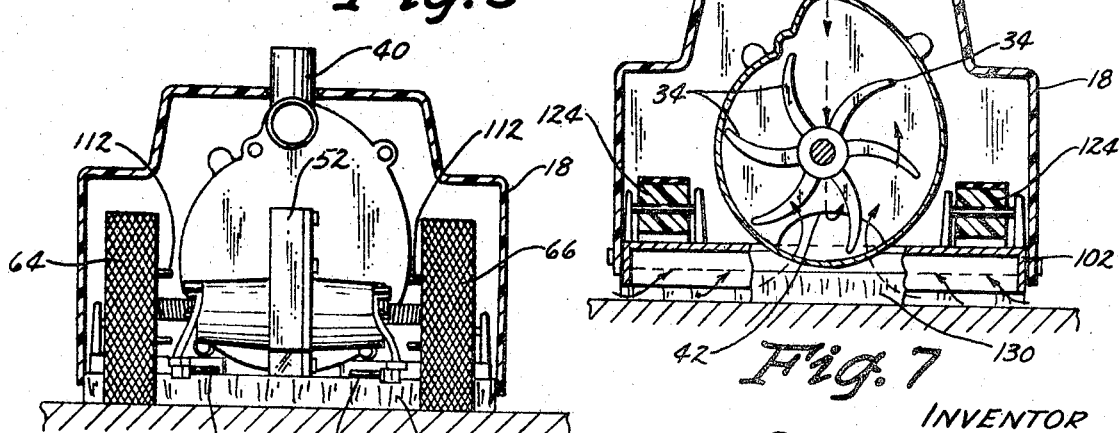
FIG. 6 is an end cross-sectional view taken along line 6—6 in FIG. 4.
Figure 7:
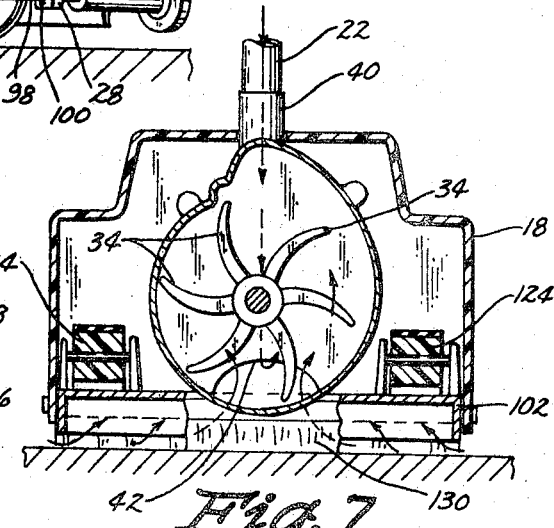
FIG. 7 is a cross-sectional view taken along line 7—7 in FIG. 5.

Referring to FIG. 8 for example it is seen that a pair of sensing members 90 are longitudinally adjustably positioned at the opposite forward corners 92 of the machine 10 and include roller elements 94 exposed to the front and the longitudinal sides of the machine housing 18. A set screw 96 permits longitudinal adjustment of the sensing members 90 on an elongated shaft 98 which extends diagonally across the machine frame 28 to adjacent the rear wheels 64 and 66. As seen in FIG. 5, a guide block 100 is mounted on the frame 28 at the forward end for the rods 98 and they are guided at their rearward ends by aligned openings in the walls 102 of a floor vacuum inlet opening 103.

The rearward ends of the rods 98 are engageable with pivotal lever arms 104 and 106 (FIG. 8) which in turn actuate the wheel transmission units 68.

The lever arm 104 as illustrated in FIGS. 9 and 10 is pivotally mounted in a horizontal plane on a pin 110 and is movable in a vertical plane against the action of a spring 111. An abutment shoulder 114 is provided adjacent the pin 110 for engagment with the inner end of the rod 98 which when actuated tends to pivot the arm 104 outwardly towards the wheel 64. A series of stop pins 112 are mounted on the inner plate 80 for engagement with a roller pin element 116 on the outer end of the lever 104 and parallel thereto.

As seen in FIG. 10, the arm 104 extends under the drive shaft 50 and has a threaded portion 118 for engagement with threads 120 on the outer shaft end 60. The threads of these two members are designed to move the arm 104 outwardly away from the stop pins 112 upon their being engaged as shown by the solid and dash line positions in FIG. 9 of the arm 104. It is thus appreciated that upon the sensing element 94 moving the rod 98 against the abutment shoulder 114 the locking arm 104 is pivoted inwardly into engagement with the stop pin 112 which causes the arm to pivot upwardly for the threaded portion 118 to engage the threaded shaft portion 60 and thus as the shaft continues this rotation the arm is then threaded outwardly again. When the stop pin 112 has engaged the roller 116 on the lock arm 104 the spur gear 70 moves on its shaft 74 in the slot 78 away from the driving dog 82 and thereupon begins rotation about its axis extending through the shaft 74 which in turn causes the ring gear 72 to reverse its direction of rotation as seen by the solid line arrow in FIG. 12. The rotation of the spur gears 70 are also indicated by the solid line arrows in FIG. 12. It is appreciated that when the arm 104 is out of engagement with the stop pins 112 the tension spring 86 will cause the driving dog 82 to re-engage the spur gear 70 and thus return the driving wheels to their forward direction of rotation.

The traction for the machine 110 is provided by a tread belt 122 which extents around the wheels 64 and 66 and over idler adjustment pulleys 124 (FIG. 10) forwardly around front wheels 126 which are driven by the tread belt 122.

Thus then it is seen that debris on the bottom 12 (FIG. 5) of the pool will be sucked in through the inlet opening 104 and closed by a flexible rubber sealing sleeve 130 in frictional engagement with the bottom pool surface 12, and/or liquid may enter from the top through the inlet 40 at any desired level in the water 16 such as at the surface as shown in FIG. 1. The chopper blade members 34 will pulverize large debris such that the pump 36 can easily discharge it out through the outlet conduit 38 into the screen bag 20. The bag is porous and thus the water is returned to the pool.

The sensing members 90 may be set at any distance forwardly of the front end of the machine 10 such that they will engage wall surfaces 140 or 142 as shown in FIG. 3 as desired. For example, the machine may be permitted to climb a curved wall a distance less than that which would cause the machine to overturn.

It is understood that for example as viewed in FIG. 8, when the lower sensing element 90 is actuated the driving wheel 64 will be reversed on the opposite side of the machine and consequently the forward end will be turned away from the obstruction engaging the sensing element 90. A similar reaction will occur when the upper sensing element is actuated as viewed in FIG. 8 from the top of the machine. It has been found that this facilitates the movement of the machine around obstructions. The amount of turning that occurs during each operation may be selectively varied but preferably is 90 degrees. The length of the threads 120 on the drive shaft portions 60, as well as for example the length of the stop pins 112 may be varied to accomplish this end.

Figure 15:
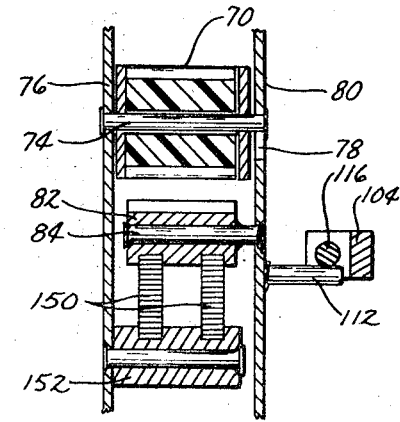
FIG. 15 is a cross-sectional view taken along line 15—15 in FIG. 14.
Figure 16:
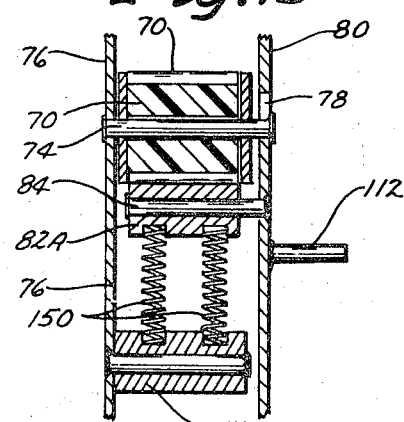
FIG. 16 is a cross-sectional view similar to FIG. 15 but showing the driving dog disengaged from the spur gear when the drive wheel is being operated in a reverse direction.
Figure 14:
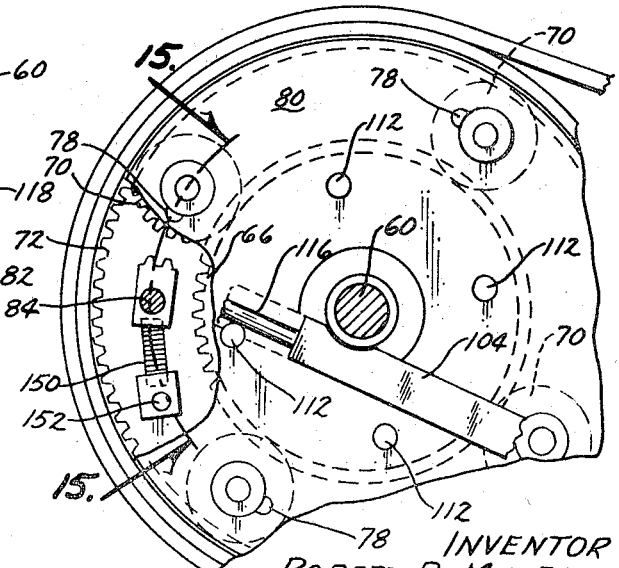
FIG. 14 is a fragmentary side elevation view of an alternate wheel transmission unit having a driving dog internally mounted and spring biased into engagement with a spur gear.

An alternate embodiment of the means for biasing the driving dog into engagement with the spur gear 70 is illustrated in FIGS. 14–16 and includes a pair of expansion springs 50 anchored to a transversely extending member 152 between the sprocket gear 66 and the ring gear 70. The anchoring member 152 for the expansion springs 150 is affixed to the outer plate 76 while the driving dog 82A is affixed to the inner plate 80 and thus when the rotation of the inner plate 80 is stopped by the arm 104 engaging the stop pin 112 the outer plate 76 tends to rotate forwardly away carrying with it the spur gear 70 normally engaging the driving dog 82A as seen in FIGS. 15 and 16 as well as FIG. 14. This arrangement shown in these figures has among other advantages the advantage of being enclosed such that it will not collect debris and the like from the pool.

With respect to the embodiment seen in FIGS. 17–19 and 22–24, the cleaner machine is generally referred to by the reference numeral 10' and is identical to machine 10 except that the sensing elements associated therewith are different. Inasmuch as machines 10 and 10' are substantially identical, the structure of machine 10' which is identical to machine 10 will not be described but identical structure thereof will be characterized by the suffix '. A clamp 150 is detachably and selectively rotatably connected to axle 152 by bolt 154. A rod 156 is secured to the forward end of clamp 150 and is slidably received by a support arm 158 by pin 160. A spring 162 embraces rod 156 between the forward end of clamp 150 and the rearward end of support arm 158 and yieldably resists the rearward movement of support arm 158. As seen in FIG. 19, support arm 158 is slidably extended through an opening 164 formed in the forward end of housing 18'. For purposes of description, elements 150, 152, 154, 156, 158, 160 and 162 are generally referred to as a sensor support means 166. A sensor support means 166 is also secured at the other side of the machine as best illustrated in FIG. 18.

A rod 168 extends through openings 170 in each of the support arms 158 and extends from opposite sides thereof. As seen in FIG. 19, opening 170 is slightly elongated to permit the movement of rod 168 therein. A right corner bumper 172 comprised of rubber tubing or the like is secured to one end of rod 168 while a left corner bumper 174 is secured to the other end of rod 168. A center bumper 176 embraces rod 168 along the central portion thereof. A cable 178 is secured to the right hand support arm 158 by any convenient means and extends diagonally rearwardly to where the rearward end thereof is detachably connected to arm 104'. A plastic sleeve 180 embraces cable 178 for the majority of its length and sleeve 180 is secured to the machine by any convenient means to add rigidity to the cable 178. Likewise, a cable 178 is connected to the support arm 158 at the left front of the machine and extends diagonally rearwardly to the other lever arm 104' to which it is detachably secured. A sleeve 180 also embraces cable 178 and is detachably secured to the machine by any convenient means to add rigidity to the cable.

Thus, the engagement of the right hand corner bumper 172 with an obstruction as illustrated in FIG. 24 will cause the cable 178 to be moved rearwardly within sleeve 180 so that the left hand lever arm 104' will be pivoted into engagement with the stop pin 112' which will cause the machine to turn away from the obstruction in a counter clockwise direction in the manner identical to that described in the operation of the embodiment seen in FIGS. 1–13. Likewise, when the left hand corner bumper 174 engages an obstruction as seen in FIG. 23, the cable 178 associated therewith will be moved rearwardly within sleeve 180 to cause the right hand lever arm 104' to be pivoted into engagement with the stop pin 112' which will cause the machine to be turned in a clockwise direction as viewed in FIG. 23 in a manner identical to that described in the operation of the machine in FIGS. 1–13. In the event that both the bumpers 172 and 174 should engage an obstruction as illustrated in FIG. 2, both of the cables 178 will be moved rearwardly within their respective sleeves to cause both of the lever arms 104' to be pivoted into engagement with their respective stop pins 112' which will cause the direction of the travel of the machine to be reversed in a manner identical to that described in the operation of the machine of FIGS. 1–13. The direction of travel of the machine will also be reversed if bumper 176 encounters an obstruction at the approximate center thereof inasmuch as the two flexible cables 178 will be moved rearwardly within their respective sleeves. If bumper 176 encounters an obstruction adjacent one end thereof, the machine will be turned as if the corner bumper adjacent thereto had engaged the obstruction. It can be appreciated that the sensor support means 166 at each side of the machine may be pivoted with respect to axle 152 to change the position of the bumpers with respect to the surface of the pool.

Electrical power is supplied to the machine by lead wires 25' which are enclosed in a flexible vinyl tube 182 which is sealed to prevent water from entering the same. The air which is trapped within the tube 182 causes the tube 182 to float in the water and flotation units are not required with this embodiment.

The pivotal connection of the sensing means with the axle supporting wheels 126 permits the sensing means at the forward end of the machine to be raised with respect to the pool bottom which permits the machine to move up inclines or slopes in the pool bottom as illustrated in FIG. 20. It can be appreciated that if the sensing means at the forward end of the machine were positioned too close to the pool bottom, the sensing means would engage the slope thereby causing the machine to be turned rather than climbing up the slope. The embodiments of FIGS 17–19 prevent such from occurring. Thus it can be seen that the device accomplishes at least all of its stated objectives.

Some changes may be made in the construction and arrangement of my swimming pool cleaner without departing from the real spirit and purpose of my invention, and it is my intention to cover by my claims, any modified forms of structure or use of mechanical equivalents which may be reasonably included within their scope.

I claim:
1. A pool cleaner machine, comprising:
   a frame,
   a pool cleaning means operatively connected to said frame,
   a support engaging drive wheel on said frame,
   a power means,
   a transmission means coupling said power means to said drive wheel, said transmission means selectively operable for driving said wheel frontwardly and rearwardly,
   a direction sensing means operatively coupled to said transmission,
   said power means normally driving said drive wheel forwardly through said transmission means and said sensing means upon being actuated thereby causing said transmission means to drive said drive wheel rearwardly,
   a control means being provided for limiting the duration of rearward drive by said transmission means, a second drive wheel on said frame and in spaced relation to said first wheel, a second direction sensing means on said frame in spaced relation to said first sensing means, said first and second sensing means being located at opposite front corners of said frame and means operatively coupling said sensing elements to diagonally opposite wheels located rearwardly of said sensing elements, whereby actuation of one of said sensing elements causes the diagonally opposite wheel to rotate in reverse and actuation of the other sensing element causes the other driving wheel to rotate in a reverse direction, said first and second sensing elements being mounted on a rod spaced forwardly of said frame and pivotally secured thereto, said rod extending between said first and second sensing elements, a third sensing element on said rod between said first and second sensing elements, whereby actuating of said third sensing element or the actuation of both of said first and second sensing elements causes the first and second drive wheels to be rotated in a reverse direction.

2. A pool cleaner machine, comprising:
a frame,
a pool cleaning means operatively connected to said frame,
a support engaging drive wheel on said frame,
a power means,
a transmission means coupling said power means to said drive wheel, said transmission means selectively operable for driving said wheel frontwardly and rearwardly,
a direction sensing means operatively coupled to said transmission,
said power means normally driving said drive wheel forwardly through said transmission means and said sensing means upon being actuated thereby causing said transmission means to drive said drive wheel rearwardly,
said direction sensing means being comprised of first and second sensing elements located at opposite front corners of the frame, and a third sensing element positioned between said first and second sensing elements and being interconnected therewith.

3. A pool cleaner machine, comprising:
a frame,
a pool cleaning means operatively connected to said frame,
a support engaging drive wheel on said frame,
a power means,
a transmission means coupling said power means to said drive wheel, said transmission means selectively operable for driving said wheel frontwardly and rearwardly,
a direction sensing means operatively coupled to said transmission,
said power means normally driving said drive wheel forwardly through said transmission means and said sensing means upon being actuated thereby causing said transmission means to drive said drive wheel rearwardly,
a control means being provided for limiting the duration of rearward drive by said transmission means,
a second drive wheel on said frame and in spaced relation to said first wheel, a second direction sensing means on said frame in spaced relation to said first sensing means, said first and second sensing means being located at opposite front corners of said frame and means operatively coupling said sensing elements to diagonally opposite wheels located rearwardly of said sensing elements, whereby actuation of one of said sensing elements causes the diagonally opposite wheel to rotate in reverse and actuation of the other sensing element causes the other driving wheel to rotate in a reverse direction,
a third sensing means being positioned between said first and second sensing means and being operatively connected thereto to cause the actuation of at least one of the first and second sensing means upon being activated.

4. The structure of claim 2 wherein means operatively couples said sensing elements to diagonally opposite wheels located rearwardly of said sensing elements, said coupling means consists of a cable member slidably mounted in an elongated flexible sleeve.

References Cited

UNITED STATES PATENTS

| 2,419,053 | 4/1947 | Bennett | 174—101.5X |
| 2,923,954 | 2/1960 | Babcock | 15—1.7 |

FOREIGN PATENTS

| 722,755 | 1/1932 | France | 15—319 |
| 1,318,091 | 1/1963 | France | 174—101.5 |
| 9,648/27 | 9/1927 | Australia | 15—1.7 |

EDWARD L. ROBERTS, Primary Examiner

U.S. Cl. X.R.

15—319